United States Patent
Fischer et al.

(10) Patent No.: US 6,293,526 B1
(45) Date of Patent: Sep. 25, 2001

(54) LIQUID DISTRIBUTOR FOR PACKING COLUMNS

(75) Inventors: Markus Fischer, Konstanz (DE); Felix Moser, Winterthur (CH)

(73) Assignee: Sulzer Chemtech AG, Winterthur (CH)

( * ) Notice: Subject to any disclaimer, the term of this patent is extended or adjusted under 35 U.S.C. 154(b) by 0 days.

(21) Appl. No.: 09/438,095

(22) Filed: Nov. 10, 1999

(30) Foreign Application Priority Data

Nov. 30, 1998 (EP) ................................................ 98811187

(51) Int. Cl.[7] ........................................................ B01F 3/04
(52) U.S. Cl. ............................................ 261/97; 261/110
(58) Field of Search ........................... 261/97, 103, 106, 261/110, 112.1, 112.2

(56) References Cited

U.S. PATENT DOCUMENTS

| | | | | |
|---|---|---|---|---|
| 3,313,533 | * | 4/1967 | Powers | 261/112.1 |
| 3,743,256 | * | 7/1973 | Oplatka | 261/112.1 |
| 4,009,229 | * | 2/1977 | Szucs et al. | 261/112.1 |
| 4,159,291 | | 6/1979 | Bruckert. | |
| 4,729,857 | * | 3/1988 | Lee et al. | 261/103 |
| 4,855,089 | * | 8/1989 | Michels | 261/97 |
| 4,981,265 | * | 1/1991 | Buhlmann | 261/97 |
| 5,783,119 | * | 7/1998 | Ulrich et al. | 261/110 |
| 5,971,370 | * | 10/1999 | Galabinski | 261/97 |

FOREIGN PATENT DOCUMENTS

| | | |
|---|---|---|
| 3013783A1 | 10/1981 | (DE). |
| 0070917A1 | 2/1983 | (EP). |
| 0282753A1 | 9/1988 | (EP). |
| 929314 * | 6/1963 | (GB) ................................. 261/110 |

* cited by examiner

*Primary Examiner*—C. Scott Bushey
(74) *Attorney, Agent, or Firm*—Townsend and Townsend and Crew LLP

(57) ABSTRACT

A liquid distributor for packing columns. The liquid distributor includes at least one tubular or trough-like distributor member including outlet openings for an output of liquid in the form of jets. Screens are arranged ahead of the outlet openings onto which the incident liquid jets are deformed to liquid films flowing off. The outlet openings screen the outlet openings against an upwardly flowing gas flow. In the event of a maximum output of liquid, the liquid jets are incident onto the screens at angles that are less than 60°, and even as much as less than 10°.

12 Claims, 4 Drawing Sheets

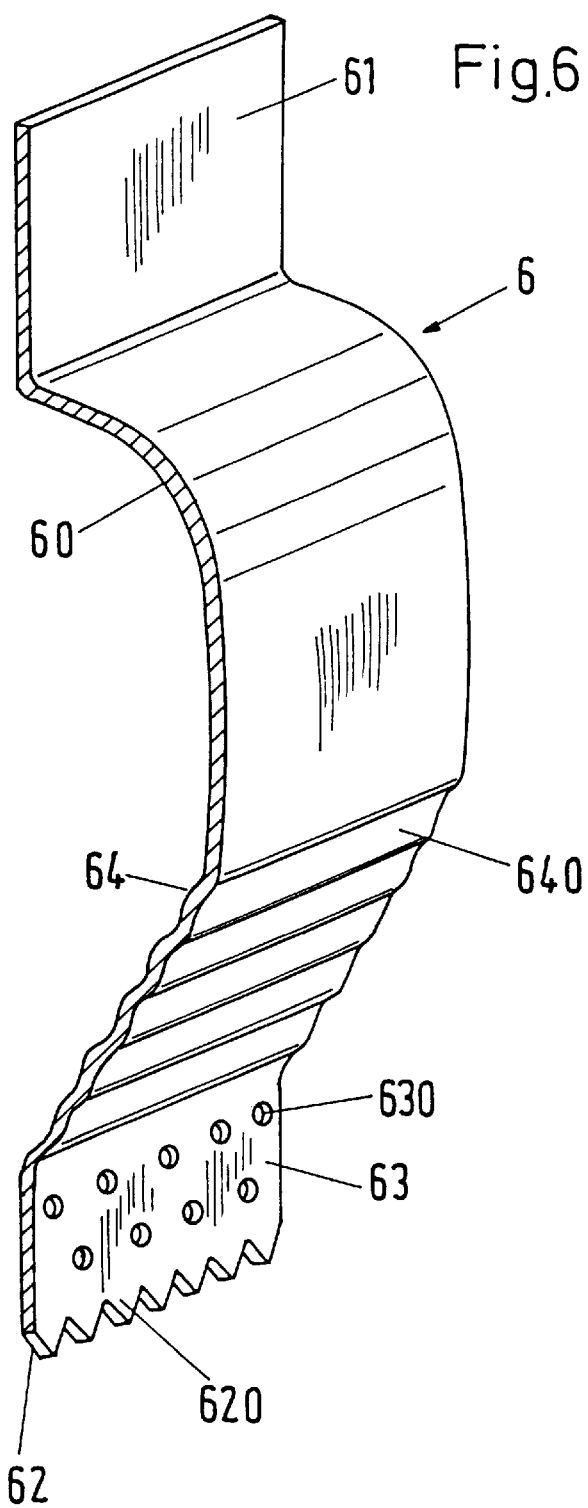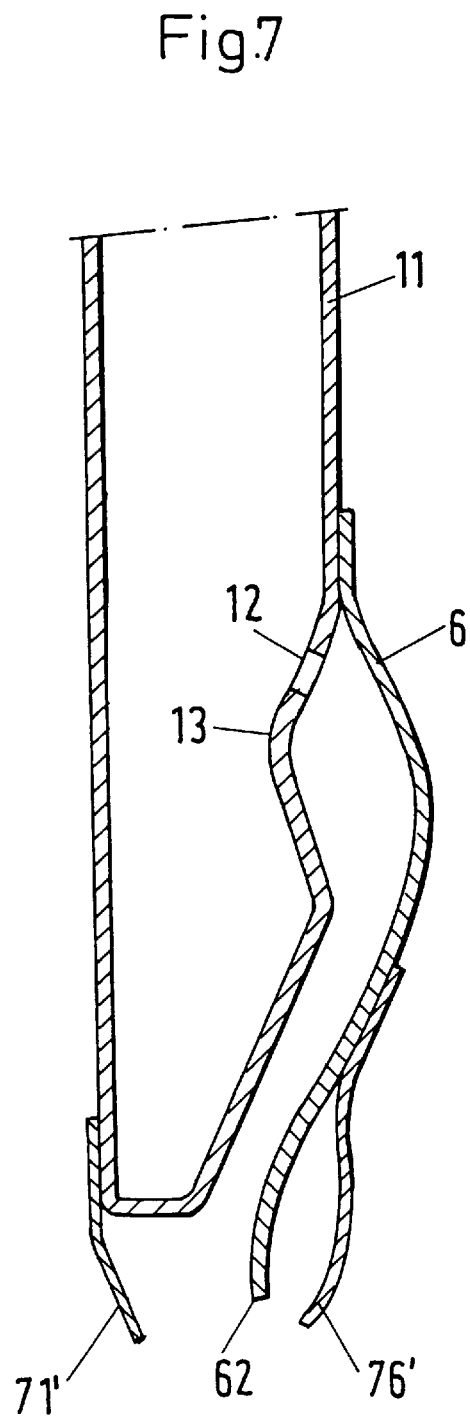

ated can be carried out with separation columns which contain "turbulence packings" (see EP 0 418 338). These

LIQUID DISTRIBUTOR FOR PACKING COLUMNS

BACKGROUND OF THE INVENTION

1. Field of the Invention

The invention relates to a liquid distributor, in particular for packing columns, and to a column with a liquid distributor of this kind.

2. Description of the Prior Art

A liquid distributor of this kind is known from EP 0 282 753 in which liquid emerges from outlet openings of tubular or trough-like distributor members and is incident as jets on screens which are formed as baffle plates (called conduction walls there). The liquid impacts at relatively high speed on the screen and distributes itself on the latter as a film of parabolic shape. This liquid distributor is provided for a packing column in which a gas is conducted in a counterflow to the liquid. A plurality of parallel distributor members subdivides the upwardly flowing gas into a plurality of partial flows. Drip edges of the screens are arranged beneath the distributor members inside stagnation zones of the gas flow.

Material exchange processes in which very large volume or mass flows are possible for the gases and liquids to be treated can be carried out with separation columns which contain "turbulence packings" (see EP 0 418 338). These large flows however present a problem: The liquid jets incident on the screens produce splashes which have a liberation of fine drops as a result. These drops fall rather slowly in the gas space and are carried along by the upwardly flowing gas in the region of the drip edges. A separation effect which is to be achieved through a material exchange is thereby impaired. It is therefore an object of the invention to create a liquid distributor for packing columns in which the named problems with the splash formation are eliminated or at least defused.

SUMMARY OF THE INVENTION

The liquid distributor for packing columns comprises at least one tubular or trough-like distributor member having outlet openings for an output of liquid in the form of jets. Screens are arranged ahead of the outlet openings onto which the incident liquid jets are deformed to liquid films flowing off. The outlet openings screen the outlet openings against an upwardly flowing gas flow. In the event of a maximum output of liquid the liquid jets are incident onto the screens at angles which are less than 60°, preferably less than 10°.

The liquid distributor in accordance with the invention can of course also be advantageously used in columns which contain ordered packings other than the "turbulence packings", for example those with a "cross channel structure" (packing with vertical layers of corrugated films which form openly crossing channels; see e.g. EP 0 070 917). Pourings of filler bodies also come under consideration as packings. In addition to a material exchange a heat transfer between a gas flow and a liquid flow can of course also be carried out.

A further problem which arises in the distributor which is known from EP 0 282 753 is solved with this liquid distributor. Because of the asymmetrical arrangement of the baffle walls the flow relationships in the gas flow are unfavorable at the drip edges, namely because no stable liquid films can form about the drip edges as a result of transverse flows. Depending on the gas charging, spray drops are taken along upwardly in greater or lesser amounts. This is also addressed by the present invention.

BRIEF DESCRIPTION OF THE DRAWINGS

FIG. 6 illustrates a strip-like section of a screen for a liquid distributor in accordance with the invention, and FIG. 7 illustrates a further embodiment.

DESCRIPTION OF SPECIFIC EXEMPLARY EMBODIMENTS

Figure 1:
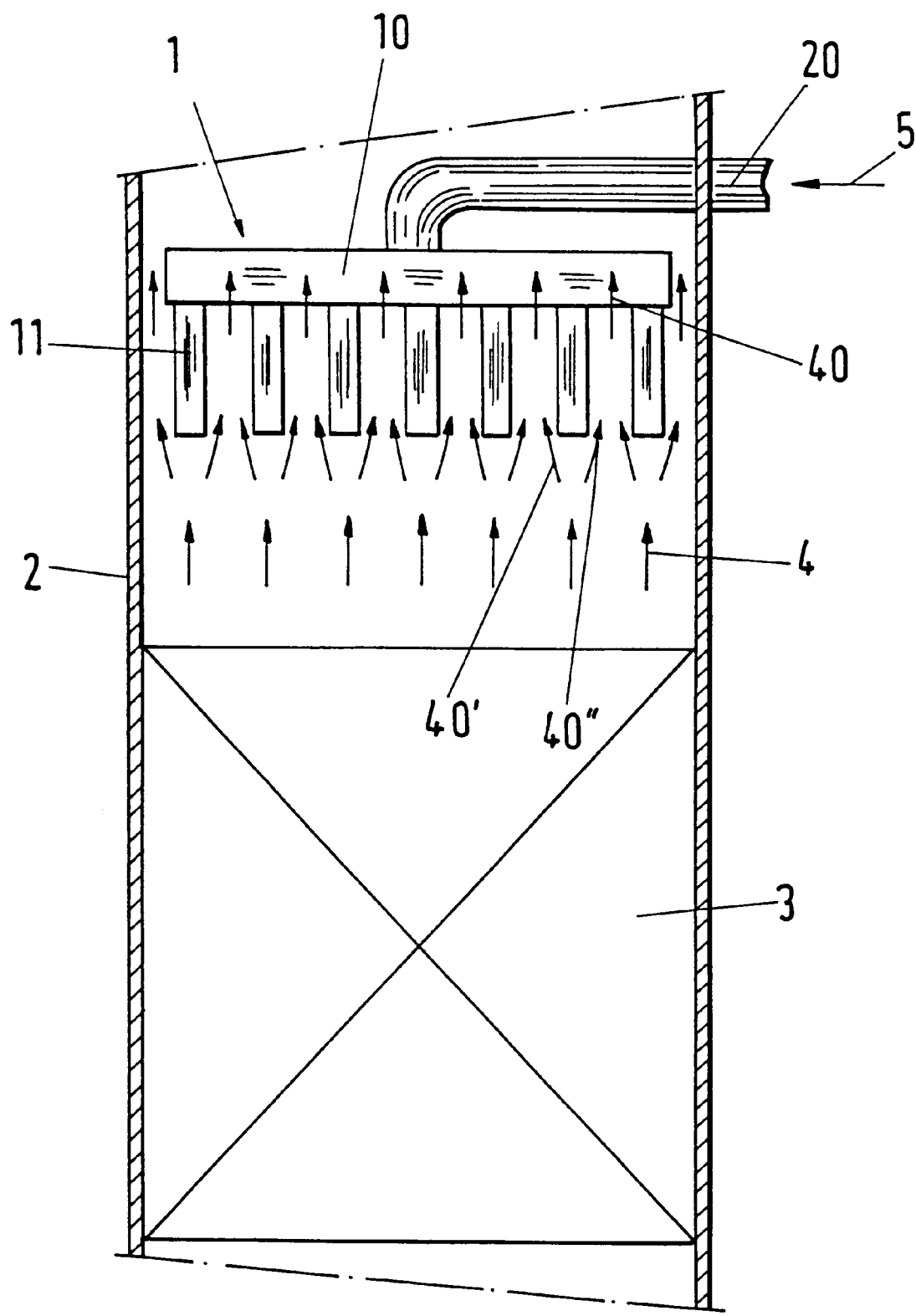
FIG. 1 illustrates sectionally, a longitudinal section through a column with a packing and a liquid distributor, FIGS. 2a, b illustrate geometrical details of the flow relationships in a distributor member of a liquid distributor in accordance with the invention.

The column 2 shown in FIG. 1 contains a liquid distributor 1 and a packing 3. A gas 4 flows upwardly in the column 2, flows around distributor members 11 of the liquid distributor 1 above the packing 3 and is thereby separated into a plurality of partial flows 40', 40", which subsequently form partial flows 40. The distributor members 11 receive a liquid 5 to be distributed via a supply line 20 and a pre-distributor 10.

Figure 2A:
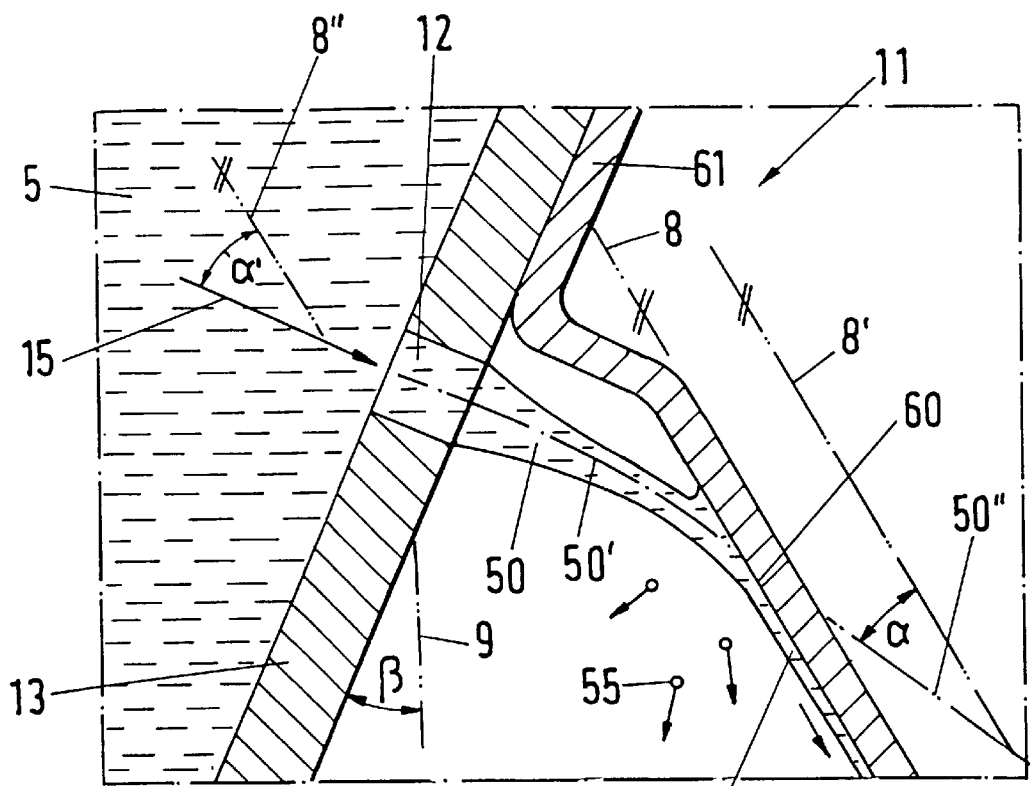

In FIG. 2a the surroundings of an outlet opening 12 of a distributor member 11 are shown as a sectional illustration for a distributor 1 in accordance with the invention. The outlet opening 12 is located in an inclined side wall 13. As a rule the side wall 13 is vertical; the angle β measured from the vertical is thus equal to zero. The liquid 5 flows out in the direction 15 through the opening 12, subsequently forms a free jet 50, the centerline 50' of which is curved downwardly in accordance with gravitation, and is incident in the direction 50" onto a screen 6 which is arranged ahead of the opening 12. An incidence region 60 of the screen 6 is assumed to be planar here. The lines 8, 8' and 8" shown in chain dotting are parallels, which is parallel to the plane lying in the incidence region 60. The incidence angle α, which is subtended by the straight lines 50" and 8', is somewhat smaller than the angle α' between the straight line 8" and the outflow direction 15. The liquid jet 50 which is incident on the screen 6 is deformed to a liquid film 51 flowing off. On incidence there arise splashes which cause fine drops 55 to arise. The smaller the incidence angle α is, the smaller is the number of drops 55 which are set free. In the screens in accordance with the prior art the jets 50 are largely perpendicularly incident (α=90°), and particularly numerous splashes arise. If the incidence angle φ is less than 60° in accordance with the invention, then the unfavorable splash formation is substantially less.

The screen 6 is secured at a strip-like region 61 at the distributor member 11 and indeed in such a manner that a passage of gas 4 is prevented and thus the outlet opening 12 is screened off by the upwardly flowing gas flow 4.

Figure 2B:
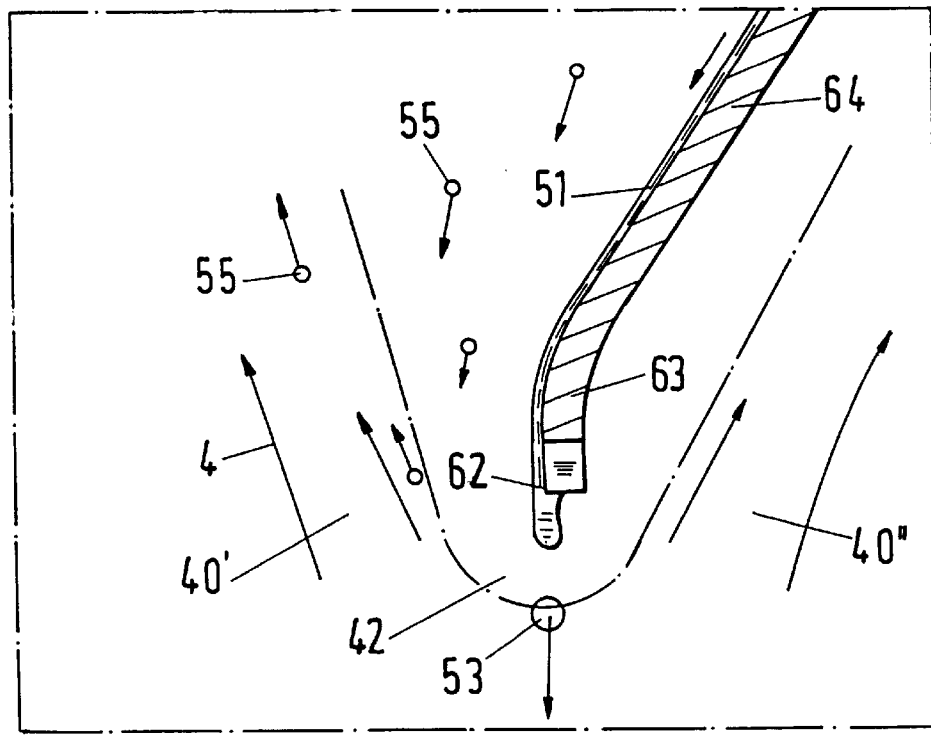

The screen 6 continues via a closed conductor wall 64—see FIG. 2b—up to a drip edge 62 at which the liquid film 51 falls downwards in the form of drops 52, 53 or continues as a connected film. The drip edge 62 is oriented horizontally and can be formed rectilinearly or in zigzag shape. The drip edge 62 is located in a stagnation zone 42 of the gas 4 in which the dripping off of the liquid 5 takes place largely undisturbed by the flow of the gas 4. A strip-like region 63, which lies largely in a vertical plane, is provided directly above the drip edge 62.

The drops 55 which are formed in the incidence zone 60 fall downwards; they are taken up by the flow 40' in the vicinity of the stagnation zone 42, carried upwards and transported further in the partial flow 40 (see FIG. 1). As a result of the measure in accordance with the present invention the number of the upwardly transported drops 55 is very small and practically no longer disturbing.

The shallow incidence angle α has as a result that the parabolic extension of the liquid film on the screen 6 depends less strongly on the momentum of the liquid jet 50. The difference between a maximum and a minimum parabola width is thus smaller. This fact facilitates the design of distributors.

Figure 3:
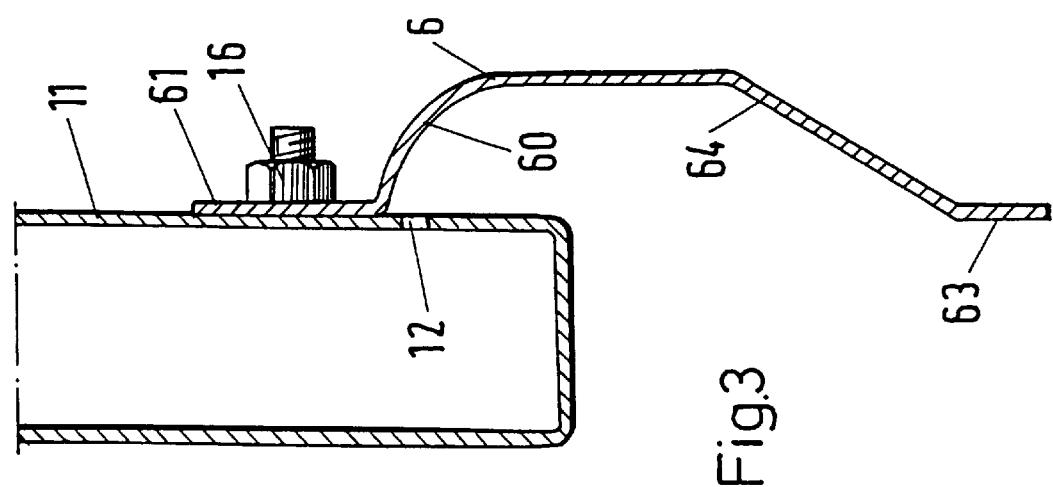

FIG. 3 shows a cross-section through the lower part of a trough-like distributor member 11. The screen 6 has the shape of a sigmoid curve, i.e. a curve which has a turning point in its curvature, in a vertical as well as jet-parallel section. This curve can be wholly or partly given by a tractor curve. In the region 60 in which the liquid jet 50 is incident on the screen 6 the sigmoid curve is downwardly curved. It has there in particular a largely constant curvature. The incidence region 60 is shaped such that the jet 51 is approximately tangentially incident on the screen 6. The screen 6 is secured at its upper part 61 with screws 16.

Through the screen 6 which is inwardly bent, i.e. bent under the distributor member 11, the liquid film 51 is far less disturbed at the drip edge 62 by the gas 4 flowing in the opposite direction than in known distributors in which the conductor surfaces 64 are designed vertically and planarly. A downward flowing film thereby remains stable; no liquid drops are torn off by and carried upwardly with the gas flow. In comparison with the known distributors the distributors in accordance with the invention can be used at substantially higher gas chargings.

Figure 4:
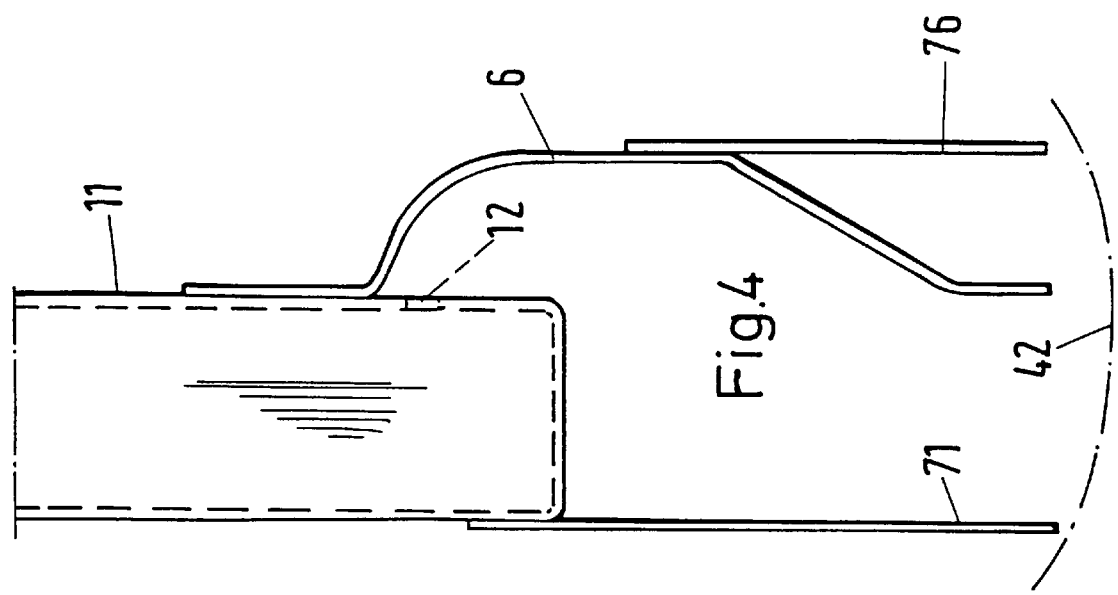

With reference to a side view, FIG. 4 shows an embodiment in which additional aprons 71 and 76 by means of which the gas flow is favorably influenced are provided in the region of the stagnation zone 42 flanking the screen 6. The screen 6 is welded on (point welded) or soldered on at the distributor member 11.

Figure 5:
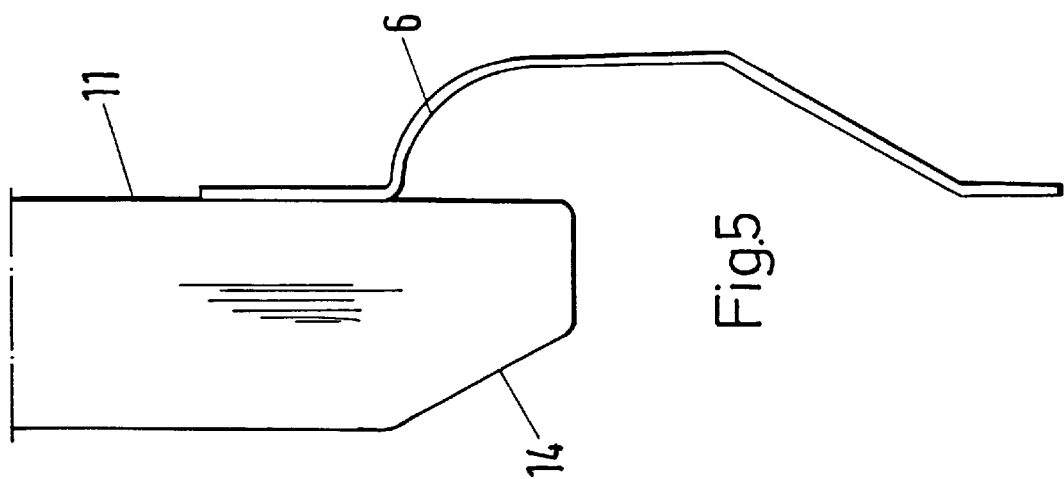
FIGS. 3–5 illustrate three embodiments of distributor members of this kind.

The distributor member 11 and the screen 6 are advantageously shaped in such a manner that in the vicinity of the stagnation zone 42 the partial flows 40', 40"—see FIGS. 1 and 2b—are formed by the drip edge 62 so as to be largely mirror symmetric with respect to one another and with respect to a vertical plane. In order to achieve this the distributor member 11 is formed in the shape of a wedge in a lower region with an inclined wall piece 14 in accordance with FIG. 5.

The screens 6 of the liquid distributor 1 in accordance with the invention can—as is illustrated in FIG. 6—have in each case a structuring through grooves 640 and/or perforations 630 for the favorable influencing of the liquid films 51. The drip edge 62 can be provided with teeth 620.

FIG. 7 shows a further exemplary embodiment in which aprons 76', 71' for the influencing of the flow are formed in a curved manner. The outlet opening 12 is arranged in an inclined part of a side wall 13 of the distributor member 11 as was already the case in FIG. 2a. In this embodiment the distributor member 11 including the screen 6 forms an obstacle for the upwardly flowing gas which is connected with a lower flow resistance than in the examples of FIGS. 3 to 5.

What is claimed is:

1. A liquid distributor comprising at least one tubular distributor member including outlet openings for an output of liquid in the form of jets and screens that are arranged ahead of the outlet openings and onto which incident liquid jets are deformed to liquid films flowing off and which screen off the outlet openings against an upwardly flowing gas flow, wherein in the event of a maximum output of liquid, the liquid jets are incident onto the screens at angles that are less than 60°, and wherein each screen has a sigmoid curve in a vertical section and a jet-parallel section, and wherein the sigmoid curve is curved downwardly.

2. A liquid distributor in accordance with claim 1 wherein the angles are less than 10°.

3. A liquid distributor in accordance with claim 1 wherein the sigmoid curve is given at least partly by a tractor curve.

4. A liquid distributor in accordance with claim 1 wherein the sigmoid curve has a largely constant curvature in a region in which the liquid jets are incident on the screen.

5. A liquid distributor in accordance with claim 4 wherein the region is shaped in such a manner that the jets are approximately tangentially incident onto the screens.

6. A liquid distributor in accordance with claim 1 wherein the screens include drip edges that are horizontally oriented and that may be formed one of rectilinearly or in a zigzagged manner.

7. A liquid distributor in accordance with claim 6 wherein strip regions that largely lie in vertical planes are provided directly above the drip edges.

8. A liquid distributor in accordance with claim 1 wherein in each case the screens include structuring through at least one of grooves and perforations for influencing the liquid films.

9. Columns including a liquid distributor, the liquid distributor comprising at least one tubular distributor member including outlet openings for an output of liquid in the form of jets and screens that are arranged ahead of the outlet openings and onto which incident liquid jets are deformed to liquid films flowing off and which screen off the outlet openings against an upwardly flowing gas flow, wherein in the event of a maximum output of liquid, the liquid jets are incident onto the screens at angles that are less than 60°, and wherein each screen has a sigmoid curve in a vertical section and a jet-parallel section, and wherein the sigmoid curve is curved downwardly, wherein a plurality of parallel distributor members subdivides a gas flow flowing upwardly in a column into a plurality of partial flows such that stagnation zones form beneath the distributor members, and wherein drip edges of the screens are arranged inside the stagnation zones.

10. A column in accordance with claim 9 wherein the distributor members and screens are shaped in such a manner that in vacinities of the stagnation zones the partial flows develop in each case largely mirror symmetrically with respect to one another and with respect to vertical planes through the drip edges.

11. A column in accordance with claim 9 wherein additional aprons are provided in the regions of the stagnation zones flanking the screens for influencing the flow.

12. A column in accordance with claim 9 wherein the distributor is arranged above a packing that has an ordered structure.

* * * * *